United States Patent
Yadav et al.

(10) Patent No.: US 9,319,276 B2
(45) Date of Patent: Apr. 19, 2016

(54) CLIENT MODELING IN A FORWARDING PLANE

(75) Inventors: Navindra Yadav, Cupertino, CA (US); Bhanu Gopalasetty, San Ramon, CA (US); Sheausong Yang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 12/928,863

(22) Filed: Dec. 21, 2010

(65) Prior Publication Data

US 2012/0155395 A1 Jun. 21, 2012

(51) Int. Cl.
*H04W 4/00* (2009.01)
*H04L 12/24* (2006.01)
*H04L 12/931* (2013.01)

(52) U.S. Cl.
CPC .......... *H04L 41/0893* (2013.01); *H04L 49/503* (2013.01)

(58) Field of Classification Search
USPC ........................................ 370/329, 322, 341
See application file for complete search history.

(56) References Cited

U.S. PATENT DOCUMENTS

| 8,467,403 | B2 * | 6/2013 | Tsier et al. ..................... 370/420 |
| 2004/0004968 | A1 * | 1/2004 | Nassar .......................... 370/401 |
| 2007/0201499 | A1 | 8/2007 | Kapoor et al. |
| 2007/0280258 | A1 * | 12/2007 | Rajagopalan et al. ..... 370/395.3 |
| 2008/0056121 | A1 | 3/2008 | Tsai et al. |
| 2008/0267201 | A1 | 10/2008 | Yang |
| 2009/0055900 | A1 | 2/2009 | Gopalasetty et al. |
| 2009/0172190 | A1 | 7/2009 | Yadav et al. |
| 2009/0180383 | A1 | 7/2009 | Katukam et al. |
| 2010/0290422 | A1 * | 11/2010 | Haigh et al. .................. 370/329 |
| 2011/0134925 | A1 * | 6/2011 | Safrai et al. ............. 370/395.53 |
| 2012/0023217 | A1 * | 1/2012 | Wakumoto .................... 709/223 |

FOREIGN PATENT DOCUMENTS

EP 1227624 7/2002

* cited by examiner

*Primary Examiner* — Dang Ton
*Assistant Examiner* — Pamit Kaur
(74) *Attorney, Agent, or Firm* — Cindy Kaplan

(57) ABSTRACT

In one embodiment, a method includes receiving a packet at a network device in communication with a plurality of client nodes, the packet identifying a first client node, performing a look up in a table stored at the network device to locate policies associated with the first client node, the table including an entry for each of the client nodes, each entry having a plurality of policies associated with the client node, applying the policies associated with the first client node at a forwarding engine at the network device, and forwarding the packet from the network device. An apparatus is also disclosed.

15 Claims, 5 Drawing Sheets

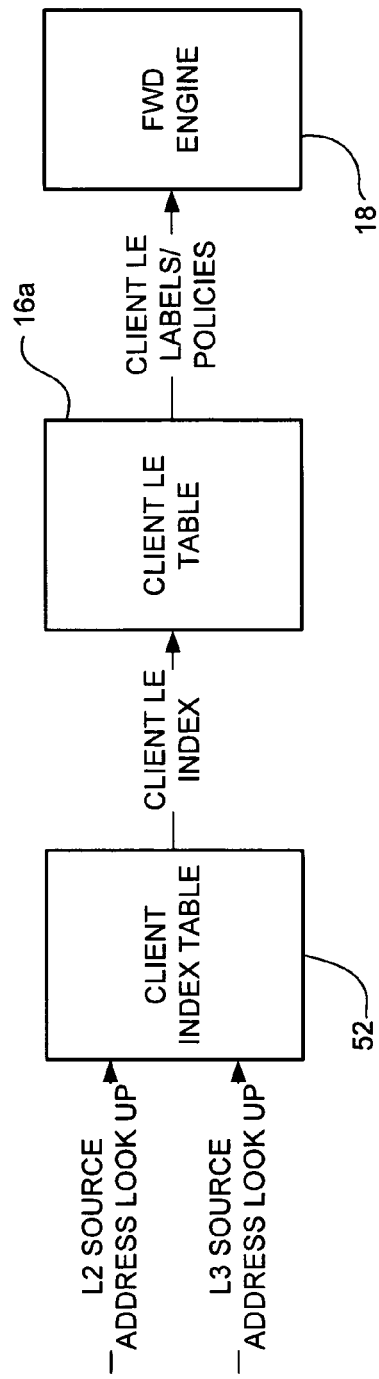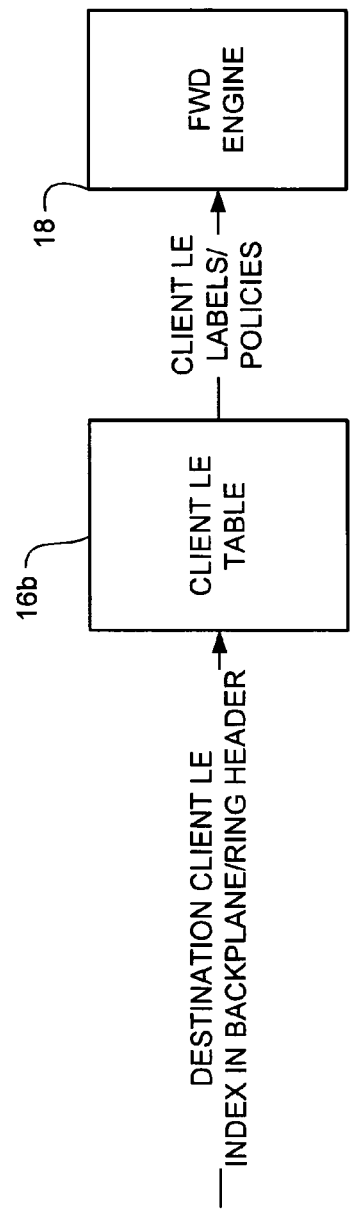
FIGURE 4A
FIGURE 4B

CLIENT MODELING IN A FORWARDING PLANE

TECHNICAL FIELD

The present disclosure relates generally to modeling a client node in a forwarding plane.

BACKGROUND

Conventional Layer 2 forwarding engines often use virtual local area network (VLAN) based forwarding. Each packet in the forwarding engine is subjected to policies configured on the associated VLAN. Layer 3 interfaces that support forwarding are assigned an internal VLAN and the policies configured on the interfaces are configured on the internal VLAN assigned to that interface. This implementation results in a number of drawbacks, including, limited scalability and impact to client roam rate in wireless applications.

BRIEF DESCRIPTION OF THE FIGURES

FIG. 4A illustrates an example of ingress logical entity derivation at the network device.

FIG. 4B illustrates an example of egress logical entity derivation at the network device.

Corresponding reference characters indicate corresponding parts throughout the several views of the drawings.

DESCRIPTION OF EXAMPLE EMBODIMENTS

Overview

Figure 1:
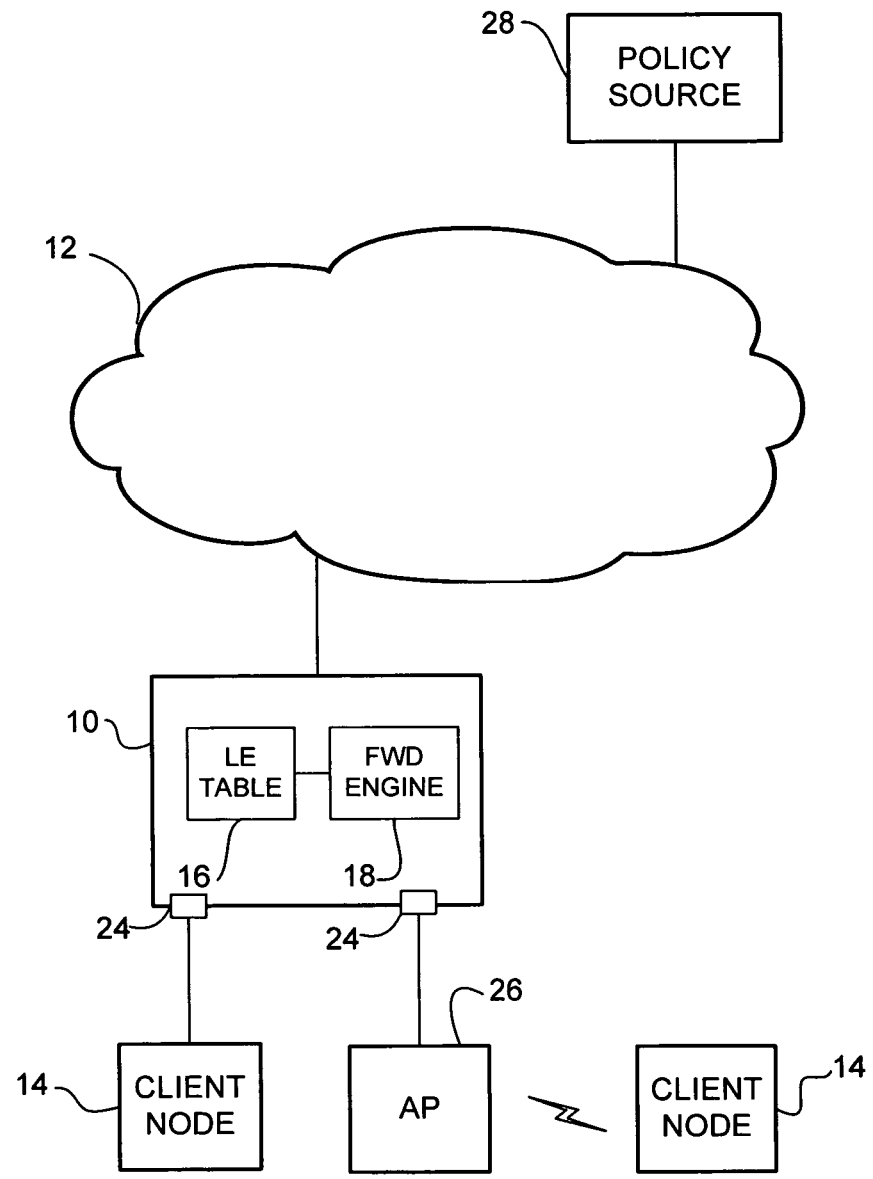
FIG. 1 illustrates an example of a network in which embodiments described herein may be implemented.

In one embodiment, a method generally comprises receiving a packet at a network device in communication with a plurality of client nodes, the packet identifying a first client node, performing a look up in a table stored at the network device to locate policies associated with the first client node, the table comprising an entry for each of the client nodes, each entry comprising a plurality of policies associated with the client node, applying the policies associated with the first client node at a forwarding engine at the network device, and forwarding the packet from the network device.

In another embodiment, an apparatus generally comprises an ingress interface for receiving a packet from one of a plurality of client nodes, the packet identifying a first client node, and a table configured for storing an entry for each of the client nodes, each entry comprising a plurality of policies associated with the client node. The apparatus further includes a forwarding engine for receiving from the table and applying the policies associated with the first client node and an egress interface for forwarding the packet from the apparatus.

EXAMPLE EMBODIMENTS

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications. Thus, the embodiments are not to be limited to those shown, but are to be accorded the widest scope consistent with the principles and features described herein. For purpose of clarity, features relating to technical material that is known in the technical fields related to the embodiments have not been described in detail.

The embodiments described herein provide a model of an entity in a forwarding plane so that policies can be applied to that entity. The term 'policy' as used herein refers to any type of policy, feature (e.g., forwarding feature), label, attribute, or service that can be configured on an entity. The term 'entity' as used herein may refer to a client, interface (e.g., layer 3 interface), port, VLAN (virtual local area network), {port, VLAN}, switch virtual interface (SVI), supervisor queue, IP Everywhere subnet, and the like. Representation of the entity at a network device is referred to herein as a 'logical entity' (LE). As described in detail below, a client logical entity is used to create a model of the client in the forwarding plane so that the logical entity can be associated with policies. This allows a network device to apply policies to packets based on a client identity associated with the packet (e.g., source node, destination node, or both source and destination nodes). For example, at an access switch, client based policies can be applied as client traffic is received by the network. It is to be understood that the terms 'client' and 'client node' as used herein may refer to an end station, host, server, wireless device, appliance, or any other node in the network to which policies can be applied and to which traffic is destined to or sourced from.

Referring now to the drawings, and first to FIG. 1, an example of a network that may implement embodiments described herein is shown. The embodiments operate in the context of a data communication network including multiple network elements. For simplification, only a small number of nodes are shown. The example shown in FIG. 1 includes a network device 10 in communication with a network 12 and client nodes 14. The network device 10 may be, for example, a switch (e.g., access switch), router, wireless controller appliance, or any other network device configured to perform forwarding operations. As described in detail below, the network device 10 includes one or more logical entity (LE) tables 16 in communication with a forwarding engine (logic) 18. In one embodiment, the LE table 16 is used to represent a client as a separate entity in hardware.

The client node 14 may be a wired device (e.g., computer, IP phone, server, host, appliance, etc.) in communication with the network device 10 using IEEE 802.3 Ethernet protocol, for example, or the end station may be a wireless device (e.g., phone, personal digital assistant, laptop, or other mobile device) using IEEE 802.11 protocol, for example. The client node 14 may also be configured for both wired communication (e.g., connected to a docking station) and wireless communication. The client node 14 may also be connected over a logical interface using, for example, GRE (Generic Routing Encapsulation) or CAPWAP (control and provisioning of wireless access points). Any number of nodes may be interposed between the network device 10 and the client node 14. For example, the network device 10 may be in wired communication with an access point 26, which is in wireless communication with the client node 14.

The network device 10 shown in FIG. 1 is also in communication with a policy source 28 via the network 12. The policy source 28 may include, for example, an authentication server (e.g., one or more access directory, access control server, AAA (authentication, authorization and accounting) server/proxy, etc.), policy server, application server, NAC (network admission control)/CCA (Cisco clean access) server, controller, client profile manager, or any other node, combination of nodes, or source (e.g., network administrator) that provides policy information for the client nodes 14.

The authenticator may use, for example EAP (Extensible Authentication Protocol), EAPoUDP (EAP over User Datagram Protocol), Web Portal authentication, IEEE 802.1x, RADIUS (Remote Authentication Dial in User Service), or any other authentication scheme. The client node 14 may be identified by a layer 2 (L2) address, layer 3 (L3) address, user identifier (ID), or machine identifier, for example. Each client identity can establish association with the other identities. For example, IEEE 802.1x establishes an association between a layer 2 address (which is a proxy for an end device) and user ID, EAPoUDP and Web Portal establishes an association between layer 3 address (which is a proxy for an end device) and user ID. DHCP (Dynamic Host Configuration Protocol) establishes association between layer 2 and layer 3 addresses.

As previously noted, a policy may be any type of feature (e.g., forwarding feature), label (e.g., label associated with a feature), attribute, or service that can be configured on an entity. For example, the policy may be a feature assigned to a client node, including for example, ACL (access control list), QoS (Quality of Service), VRF (virtual routing and forwarding) instance. The policy may also be associated with a status of the client node or user, including for example, location (e.g., building, floor, site, wiring closet, device, port), role (e.g., administrator, executive, engineering, software, quality assurance), posture status, client state, type of device (e.g., IP phone, server, generic host), network (e.g., subnet, VLAN, port, interface), application type, device type, traffic class, authentication type, mobility, etc.

The policies may be client specific or associated with a group to which the client belongs. For example, a layer 2 address may be a member of a physical port or a logical interface, a layer 3 address may be a member of a subnet, a machine ID may be a member of a particular posture-state group, or a user ID may be a member of a user role. The policy may be attached to a client logical entity or a group at the modeling level. As described in detail below, the LE table 16 preferably includes all of the policies associated with the client (e.g., identity specific or group specific). Client traffic may be subjected to features configured on the client as well as features configured on a group (e.g., VLAN, port, SSID (service set identifier), access point, etc.). The policies or groups may be changed in which case the LE table 16 is updated.

It is to be understood that the network shown in FIG. 1 and described herein is only a simplified example and that networks having other devices and configurations may be used without departing from the scope of the embodiments. Also, protocols other than discussed herein may be used for communication within the wired or wireless network and policies other than described herein may be associated with an entity.

Figure 2:
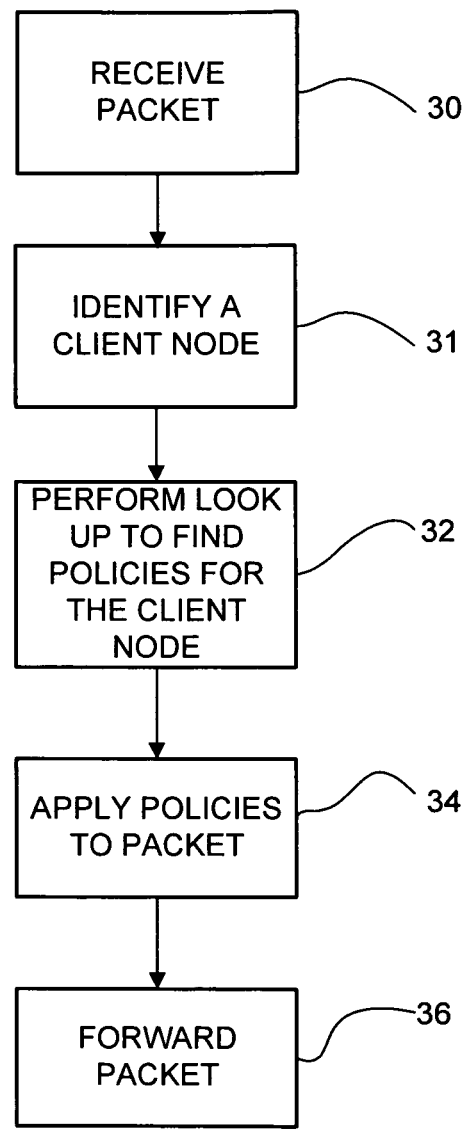
FIG. 2 is a flowchart illustrating an overview of a process for modeling a client node at a network device and applying policies to packets based on the model.

FIG. 2 is a flowchart illustrating an overview of a process for modeling a client node in a forwarding plane and applying policies to packets based on the model, in accordance with one embodiment. At step 30, a packet is received at a network device (e.g., switch 10) in communication with a plurality of client nodes 14 (FIGS. 1 and 2). One of the client nodes is identified as a first client node (step 31) based on information in the packet (e.g., source node, destination node). A look up is performed in the LE table 16 to find policies associated with the client node identified in the packet (step 32). The LE table 16 includes an entry for each of the client nodes and each entry includes policies associated with the client node. The look up may be any type of search performed in a data structure for an entry corresponding to one of the client nodes. In one embodiment, an index is generated at the network device based on an address of the client node, and the index is used in the look up table. The index may be associated with one or more of the client nodes. The policies assigned to the client node 14 are applied at the forwarding lookups (forwarding engine 18) (step 34) and the packet is forwarded from the network device (step 36). In one embodiment, the LE table 16 includes labels and an additional look up is performed at the forwarding engine 18 for features corresponding to each label. As described below, the network device 10 may apply policies associated with a source node and a destination node.

It is to be understood that the process illustrated in the flowchart of FIG. 2 and described above is only one example and that steps may be removed or added, without departing from the scope of the embodiments.

Figure 3:
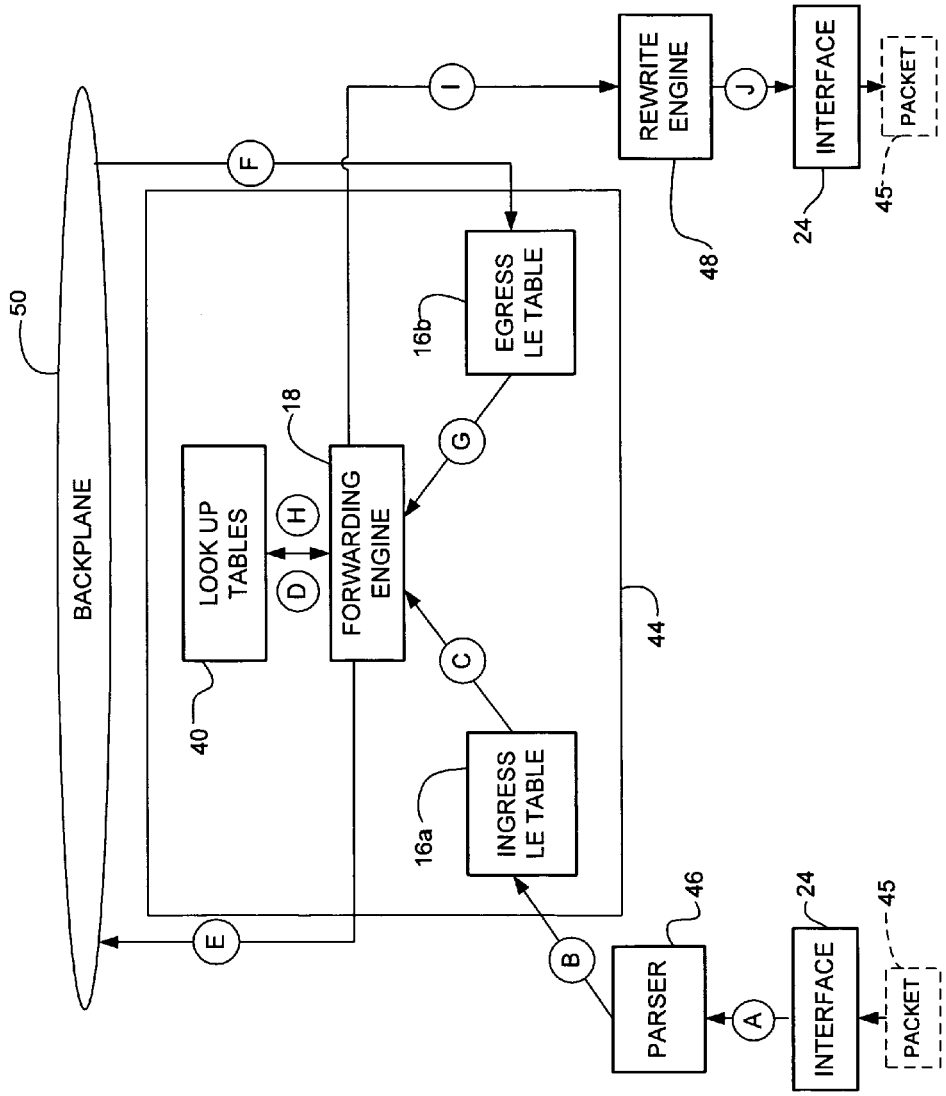
FIG. 3 is a diagram illustrating an example of packet flow through the network device.

FIG. 3 illustrates one example of the network device 10 and a packet flow through the network device, in accordance with one embodiment. In the example shown in FIG. 3, the network device includes an ingress LE table 16a, egress LE table 16b, forwarding engine (logic) 18, and feature label look up tables 40 in a forwarding controller block 44. It is to be understood that even though separate ingress and egress LE tables 16a, 16b are shown in FIG. 3, the network device may also be configured with only one LE table. The look up table 40 accessed by the forwarding engine 18 may include, for example, a ternary content addressable memory (TCAM) and static random access memory (SRAM). The network device 10 further includes two or more interfaces 24 (e.g., cards, adapters, ports) for transmitting data to other network devices, receiving data, and forwarding received data to internal components.

In the example shown in FIG. 3, the ingress interface 24 is in communication with a parser (e.g., flex parser) 46 and the egress interface is in communication with a rewrite engine 48. The forwarding controller block 44 is in communication with a ring (e.g., backplane or switching fabric) 50, which connects multiple integrated circuits or multiple network devices on a common control plane.

In one embodiment, the client is modeled in hardware at the network device 10. For example, the forwarding logic 18, LE tables 16a, 16b, and lookup tables 40 may be located on one or more ASIC (application specific integrated circuit). The hardware may be configured to derive an LE index based on one or more parameters and derive multiple LE indices at a time, as described below.

The network device 10 also includes a processor and memory for storing various applications, modules, and data for execution by the processor. Logic (software, code) may be used to program the hardware (e.g., LE tables 16a, 16b, look up tables 40). Logic may be encoded in one or more tangible media for execution by the processor and the processor may execute codes stored in a computer-readable medium. The computer-readable medium may be, for example, electronic (e.g., RAM (random access memory), ROM (read-only memory), EPROM (erasable programmable read-only memory)), magnetic, optical, electromagnetic, semiconductor technology, or any other suitable medium.

The following describes an example of packet flow with respect to operations indicated at (A) through (J) in FIG. 3.

A packet 45 received at the ingress interface 24 goes through conventional checks (e.g., CRC (cyclic redundancy check)) and is fed into the parser 46 at (A). The source VLAN and source port are remembered for the packet. The parser 46 parses the L2 (layer 2), L3 (layer 3), and L4 (layer 4) headers and key fields (e.g., source-MAC (media access control) address, source-IP address) are remembered in a packet information structure. These fields along with source-VLAN and source-port label are fed into LE generation logic (described below with respect to FIG. 4A) to derive an ingress LE index or a set of ingress LE indices at (B).

Using the LE index (or indices), a look up is performed at the ingress LE table 16a to obtain the LE entry that has the feature labels and properties that will be applied to the packet at the forwarding engine 18. The feature labels are fed to the forwarding logic 18 at (C). The forwarding engine 18 uses the label look up tables 40 to find the features associated with the labels provided by the ingress LE table 16a at (D).

The forwarding engine 18 subjects the packet 45 to ingress features configured on the logical entity and forwards the packet to the backplane 50 using either routing or L2 bridging at (E). The forwarding engine 18 also generates a destination index (DI) and rewrite index (RI). The DI tells the system which set of interfaces (logical or physical) out of which the packet needs to be forwarded. The RI tells the system how to rewrite the packet. The rewrite index may also carry the egress LE index or carry a pointer to the location where the egress LE index is stored. In the case of multicast, the rewrite index may carry a MED (multicast expansion descriptor) pointer.

On the egress side, the egress LE table 16b is looked up using the rewrite index (or egress LE index) to obtain the egress LE entry at (F). This entry is fed into the forwarding engine 18 to apply egress features on the packet at (G). Forwarding logic 18 looks up and applies the egress features based on the labels found in the egress LE table 16b at (H). The packet 45 is rewritten if needed at (I), and sent out of the egress interface 24 at (J).

FIGS. 4A and 4B illustrate ingress and egress client LE derivation, respectively, in accordance with one embodiment. At the ingress, a client index look up table 52 is searched using, for example, the source MAC address or source IP address of the packet. At the egress, there is no need for the client index look up table to derive an LE, as the destination client LE index is provided by the rewrite index or is carried from the ingress on the backplane/ring 50.

For the ingress, LE derivation is a two step process. First, based on the source node address (e.g., L2, L3, or both L2 and L3 addresses) the client index table 52 is searched to identify a client LE index (FIG. 4A). As described below, client LE index derivation may also be based on client identity along with other information (e.g., port, interface, VLAN). Second, the LE index is used to find the LE entry in the client LE table 16a. The client policies are applied at the forwarding engine 18. In one embodiment, the LE entry in the LE table 16a includes client labels which are used to find the features in look up table 40, which are applied at the forwarding engine 18 (FIGS. 3 and 4A). The forwarding engine 18 generates the destination index the packet is to go out on and the rewrite index (as described above with respect to (E) in FIG. 3).

In the example shown in FIG. 4B, the destination client LE index is carried in the backplane/ring header. The rewrite index may carry the egress LE index or a pointer to a location that has the egress LE index (in the case of multicast). The client LE table 16b provides the egress client labels that are used to find the features at look up table 40, which are applied at the forwarding engine 18.

Figure 5:
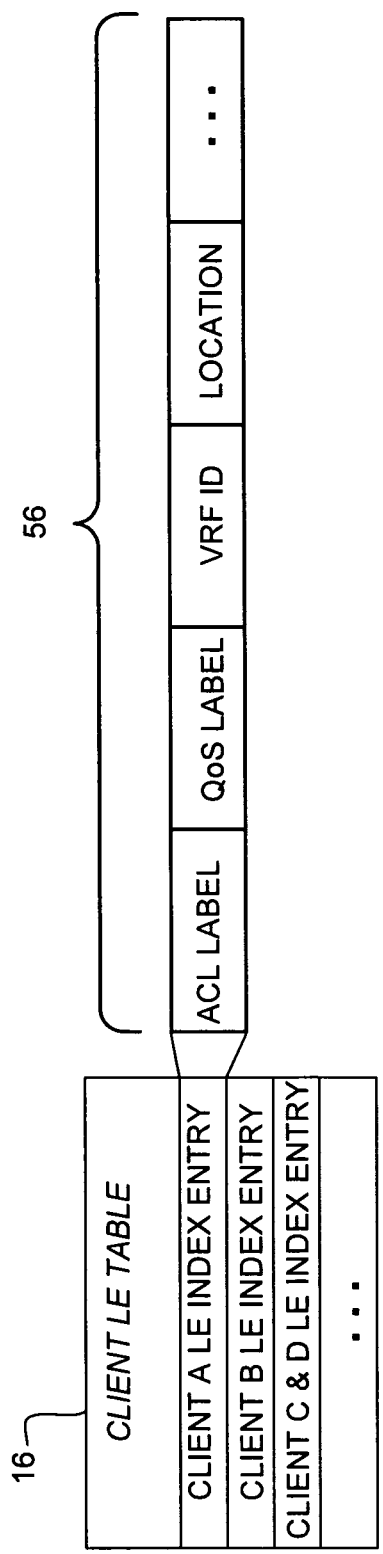
FIG. 5 illustrates an example of a client logical entity table at the network device.

FIG. 5 illustrates an example of entries in the client LE table 16. Each entry includes an LE index, which corresponds to one or more client nodes, and a plurality of policies 56. The LE entry includes all of the forwarding parameters including the feature labels which are fed to the forwarding engine 18.

It is to be understood that the LE table shown in FIG. 5 is only an example and that the policy information may be stored in any type of data structure. Thus, the term 'table' as used herein refers to any memory for storing a data structure and the term 'look up' refers to any type of search in the data structure.

As previously noted, entities other than client nodes may be represented by a logical entity. In one embodiment, multiple LEs may be derived (e.g., client LE, VLAN LE, port LE, L3 interface LE). Multiple LE indices may be generated and used to identify LE entries in corresponding LE tables. Thus, for a given packet, multiple LEs may be fed to the forwarding engine for application to the packet. For the case where a packet from a particular host needs to be subjected to client policies, port policies, and VLAN policies, for example, multiple LEs may be derived at the ingress and the ingress policies applied on all of the LEs (e.g., client LE for client policies, port LE for port policies, and VLAN LE for VLAN policies). One or more of the policies obtained from the LE tables may have priority. For example, the policies from the client LE table may have priority over policies from the VLAN LE table, port LE table, or L3 interface LE table. Alternatively, all of the features may be merged and the final result labels stored in the client LE table with the LE index derived as described above.

In cases such as virtualization, in which multiple clients reside on the same host, an additional identifier such as a tag may be used to distinguish between different clients that share the same MAC or IP address. Also, different policies may be applied to different flows (e.g., voice, video, data) from the same client, using policy groups for example. These may be applied in the LE table based on flow classification, for example.

In the case of wireless, client context roams along with the client. In addition to the wireless specific information, the context contains per user policies which include, for example, client ACLs downloaded from an AAA server, client QoS policies, etc. Each wireless client is represented by an LE in the hardware and this LE carries the features a wireless client is configured with. In the event of a client roaming away from the network device, the client LE is removed. Similarly, when a client roams to a new network device, a new client LE is added. Mobility roam rate is improved since policies can be implemented in the forwarding plane without the need to program the policy at roam time.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:
1. A method comprising:
receiving a packet at a network device in communication with a plurality of client nodes and a policy source comprising policy information for the client nodes, the packet identifying a first of said client nodes comprising a source node transmitting the packet;
performing a look up in an ingress table to locate policies associated with the source node and an egress table to locate policies associated with one of said client nodes identified in the packet as a destination node, the ingress table and egress table stored at the network device and comprising an entry for each of said client nodes, each entry comprising a plurality of policies associated with the client node;

applying said plurality of policies at a forwarding engine at the network device, wherein applying said plurality of policies comprises applying both ingress features associated with the source node and egress features associated with the destination node; and forwarding the packet from the network device;

wherein each of said entries comprises an index corresponding to one or more of said client nodes, the index for said first client node derived based on an address of said first client node and one or more of a port, a virtual local area network, and an interface associated with said first client node.

2. The method of claim 1 wherein said plurality of policies comprises a plurality of labels and applying said policies comprises performing a look up to locate features for said labels.

3. The method of claim 1 wherein said first client node comprises a wireless device.

4. The method of claim 1 wherein the network device is an access switch.

5. The method of claim 1 wherein the network device is located in a virtual local area network and said packet comprises a virtual local area network identifier.

6. The method of claim 1 further comprising applying policies associated with one or more of a port, a virtual local area network, and an interface, before forwarding the packet.

7. The method of claim 1 further comprising generating a rewrite index at the forwarding engine based on lookup performed in the ingress table, wherein the rewrite index is used in the lookup performed at the egress table.

8. An apparatus comprising:
an ingress interface for receiving a packet from one of a plurality of client nodes, the packet identifying a first of said client nodes comprising a source node transmitting the packet and one of said client nodes as a destination node;
a table configured for storing an entry for each of said client nodes, each entry comprising a plurality of policies associated with the client node, the table comprising an ingress table for storing policies associated with the source node and an egress table for storing policies associated with the destination node;
a forwarding engine for receiving from the table and applying said policies associated with said first client node, wherein applying said policies comprises applying both ingress features associated with the source node and egress features associated with the destination node;
an egress interface for forwarding the packet from the apparatus; and
memory for storing said policies received from a policy source providing policy information for the client nodes;

wherein each of said entries comprises an index corresponding to one or more of said client nodes, the index for said first client node derived based on an address of said first client node and one or more of a port, a virtual local area network, and an interface associated with said first client node.

9. The apparatus of claim 8 wherein said first client node is a wireless device and the apparatus is an access switch.

10. The apparatus of claim 8 wherein the forwarding engine is further configured to apply policies associated with one or more of a port, virtual local area network, and an interface, before forwarding the packet.

11. The apparatus of claim 8 further comprising:
a parser in communication with the ingress interface and operable to parse data in the received packet to derive the index; and
a rewrite engine in communication with the egress interface.

12. An apparatus comprising:
an ingress interface for receiving a packet from one of a plurality of client nodes, the packet identifying a first of said client nodes comprising a source node transmitting the packet and one of said client nodes as a destination node;
means for performing a look up in a table stored at the apparatus for policies associated with said first client node, the table comprising an entry for each of said client nodes, each entry comprising a plurality of policies associated with the client node, the table comprising an ingress table for storing policies associated with the source node and an egress table for storing policies associated with the destination node;
means for applying said plurality of policies associated with said first client node at a forwarding engine at the apparatus, wherein means for applying said policies comprises means for applying both ingress features associated with the source node and egress features associated with the destination node; and
an egress interface for transmitting the packet from the apparatus;
wherein each of said entries comprises an index corresponding to one or more of said client nodes, the index for said first client node derived based on an address of said first client node and one or more of a port, a virtual local area network, and an interface associated with said first client node.

13. The apparatus of claim 12 wherein said plurality of policies comprises a plurality of labels and applying said policies comprises performing a look up to locate features for said labels.

14. The apparatus of claim 12 wherein said first client node comprises a wireless device.

15. The apparatus of claim 12 wherein the apparatus is an access switch.

* * * * *